United States Patent [19]
Wingler et al.

[11] 3,935,138
[45] Jan. 27, 1976

[54] PULVERULENT BINDERS

[75] Inventors: Frank Wingler, Leverkusen; Josef Pedain, Cologne; Richard Müller, Bergisch-Neukirchen; Rolf Dhein, Krefeld-Bockum; Eckhard de Cleur, Duisburg, all of Germany

[73] Assignee: Bayer Aktiengesellschaft, Germany

[22] Filed: May 28, 1974

[21] Appl. No.: 473,391

[30] Foreign Application Priority Data
June 1, 1973   Germany............................ 2328013

[52] U.S. Cl. ..... 260/17 R; 260/30.6 R; 260/31.8 R; 260/31.8 E; 260/42.21; 260/42.28; 260/42.29; 260/42.52; 260/78.4 EP; 260/78.4 D; 260/827; 260/836; 260/873; 260/901
[51] Int. Cl.² .................... C08F 18/14; C08K 3/00
[58] Field of Search........ 260/78.4 EP, 78.4 D, 836, 260/42.52, 42.28, 42.29, 42.21, 30.6 R, 31.8 R, 31.8 E, 17 R, 827, 873, 901

[56] References Cited
UNITED STATES PATENTS

| | | | |
|---|---|---|---|
| 3,337,509 | 8/1967 | Budnowski et al. | 260/77.5 NC |
| 3,674,892 | 7/1972 | Aggias | 260/78.4 EP |
| 3,752,793 | 8/1973 | Arlt | 260/78.5 T |
| 3,753,958 | 8/1973 | Wingler et al. | 260/80.7 S |
| 3,758,633 | 9/1973 | Labana | 260/836 |
| 3,799,900 | 3/1974 | Weinrich | 260/78.4 EP |

*Primary Examiner*—James H. Derrington
*Attorney, Agent, or Firm*—Connolly and Hutz

[57] ABSTRACT

Powdered coating agent for use in the sprayed powder process comprising a mixture of
  A. free hydroxyl groups containing copolymers having been reacted with an acid anhydride;
  B. a cross-linker such as triglycidyl isocyanurate or bis- or tris-oxazolines and optionally
  C. auxiliary agents such as pigments and levelling agents.

The copolymer contains polymerized units of
  30 to 85% by weight of styrene or derivatives thereof or methylmethacrylate or mixtures thereof;
  5 to 60% by weight of acrylic or methacrylic esters excepted methylmethacrylate and
  10 to 30% by weight of hydroxyalkylester of acrylic or methacrylic acid, said copolymer having been reacted with an aliphatic or cycloaliphatic dicarboxylic acid anhydride;
  4 to 20 parts by weight of the cross-linker are employed for 96 to 80 parts by weight of the acidified copolymer.

3 Claims, No Drawings

PULVERULENT BINDERS

This invention relates to pulverulent binder mixtures which are pourable at 40° to 50°C. based on reaction products of at least one aliphatic and/or cycloaliphatic dicarboxylic acid anhydride with hydroxylated acrylic ester copolymers as well as triglycidyl isocyanurate or bis- or tris-oxazolines.

It is known to use pulverisable acrylic resins which are mainly built up of styrene and esters of acrylic or methacrylic acid for powder coating processes, in particular for the electrostatic powder spray process. Resins which contain acrylic or methacrylic acid in a copolymerised form as reactive groups are in practice particularly important. The acid resins can be cross-linked with bis-oxazolines, bisoxazines or polyepoxides such as triglycidyl isocyanurate (see U.S. Pat. No. 3,752,793 and German Offenlegungsschriften Nos. 2,127,684 and 2,155,257).

Coatings obtained using these substances are distinguished by their high surface gloss and hardness which are maintained even after many years exposure to open air weathering. The stoving conditions of these binders are about 30 minutes at 160°–180°C if their acid number is between 55 and 120 mg of potassium hydroxide per g of substance (see F. Wingler et al., Farbe and Lack, 11 1063 (1972).

Binders for the electrostatic powder spray process should, in their uncrosslinked state, constitute brittle, easily pulverised resins which remain pourable as powders at temperatures of up to 50°C, if possible, and should not lump together. After they have been applied by electrostatic spraying, the powders should spread smoothly over the substrate at temperatures of 80° to 120°C and harden to insoluble, infusible coatings at temperatures above 120°C. In addition, the powders must be capable of being electrostatically charged and retaining their electric charge on metal objects for some time until the stoving process. Furthermore, the binders must not undergo premature crosslinking in the region of their flow temperature because they are generally mixed with pigments, catalysts and levelling agents at temperatures of about 100°C when they are in the molten state. If an external cross-linking agent is used as in the mixture according to the invention, the component which acts as cross-linking agent must melt at the temperature at which the resin also melts and must be compatible and homogeneously miscible with the resin. When the mixture solidifes, the cross-linking agent added must not reduce the stability in storage at temperatures up to 50°C and the mixture must not separate into its components when cold. After spreading and stoving, the compatible mixture of cross-linking agent and resin should form a high gloss coating which is resistant to chemicals, solvents and weathering.

Powder lacquers based on polyepoxides and polyesters are already known and substantially fulfil the requirements described above but, for many purposes, they are still insufficiently weather resistant. The low standard of weather resistance of epoxide powder lacquers has stimulated industry to develop acrylate based powder lacquers.

For some purposes, e.g. for lacquer top coats used on motor cars, low stoving temperatures and short stoving times are desirable. Car bodies have soldered joints at various points, which are liable to dissolve or become distorted at elevated temperatures. Short stoving times are also desirable on economic grounds.

It was an object of this invention to develop pulverulent binder mixtures based on acid acrylate resins and triglycidyl isocyanurate or bis- or tris-oxazolines which, while having equally good lacquer properties such as level flow, gloss retention and resistance to weathering, would have a lower stoving temperature or a shorter stoving time at higher stoving temperatures than the acid acrylate binders known at present.

The problem was reduced or substantially solved by using pulverulent binder mixtures which are still pourable at 40° to 50°C of relatively low molecular weight copolymers of styrene, (meth)acrylates, hydroxyalkylesters of (meth)acrylic acid in which 50 to 100 mols-% of the free hydroxyl groups have been reacted with at least one aliphatic or cycloaliphatic dicarboxylic acid anhydride, and triglycidyl isocyanurate or bis- or tris-oxazolines.

This invention thus relates to pulverulent binder mixtures which are still pourable at 40° to 50°C and which are based on a copolymer of styrene, a (meth)acrylate, a hydroxyalkyl ester of (meth)acrylic acid and triglycidyl isocyanurate or bis- or tris-oxazolines, characterized in that the binders comprise a mixture of A. a random addition copolymer of
   I 30 to 85% by weight of styrene, α-methylstyrene, o-chlorostyrene, p-chlorostyrene, p-tert.-butyl-styrene or methylmethacrylate or mixtures thereof,
   II 5 to 60% by weight of an acrylic acid ester preferably containing from 1 to 12 carbon atoms in the alcohol part or methacrylic acid ester preferably containing from 2 to 12 carbon atoms in the alcohol part or mixtures thereof, and
   III 10 to 30% by weight of a hydroxyalkyl ester of acrylic acid or methacrylic acid containing 2 to 4 carbon atoms in the hydroxyalkyl group, which polymerised units have a hydroxyl number of 50 to 126 mg of potassium hydroxide per g of substance, 50 to 100 mols percent of the free hydroxyl groups having been reacted with at least one aliphatic or cycloaliphatic dicarboxylic acid anhydride, resulting in an acid number of 22 to 110 mg of potassium hydroxide per g of substance, and the sum of the percentage contents I to III is 100% and the average molecular weight is 3,000 to 20,000, B. a cross-linker such as triglycidyl isocyanurate or bis- or tris-oxazolines and optionally C. auxiliary agents such as pigments and levelling agents and that the mixture contains 4 to 20 parts by weight of triglycidyl isocyanurate or bis- or tris-oxazolines to 96–80 parts by weight of acrylic resin (A) and optionally, in addition, up to 150% by weight, based on (A) and (B), of pigments and 0.1 to 40% by weight, based on (A) of a levelling agent.

The binder mixtures already harden at 140° to 160°C within 10 to 30 minutes. In other words, the times required for hardening them at 160°C, which are in the region of 10 to 30 minutes, are shorter than those required for the known binders based on acrylic or methacrylic acid, which require at least 30 minutes for hardening at 160°C.

It was surprising to find that more highly reactive binder mixtures are obtained when the carboxylic acid group on the macromolecule is produced by reacting free hydroxyl groups with at least one aliphatic or cycloaliphatic dicarboxylic acid anhydride. The reaction results in aliphatic or cycloaliphatic carboxylic acid groups which react more rapidly with triglycidyl isocyanurate or bis- or tris-oxazolines than do the aliphatic carboxylic acid groups of the known acrylic or methacrylic acid copolymers.

The preparation of the copolymers is carried out by known methods of solvent-free, solution or dispersion polymerisation and bead polymerisation, solution or solvent-free polymerisation being preferred. These methods have been described, for example in "Methoden der Organischen Chemie" Houben-Weyl, 4th Edition, Volume 14/1, pages 24–556 (1961).

Where the polymerisation is carried out in solution, solvents such as methylene chloride, ethanol, isopropanol, n-propanol, n-butanol, isobutanol, tert.-butanol, acetic acid methyl up to butyl ester, acetone, methyl ethyl ketone, benzene and toluene may be used.

The polymerisations are preferably carried out at temperatures of from 40°C to 180°C.

The initiators used may be, for example, percarbonates, peresters such as tert.-butyl perpivalate or tert.-butyl peroctoate, benzoyl peroxide, o-methoxy-benzoylperoxide, dichlorobenzoylperoxide or azodiisobutyric acid dinitrile. They may be used in quantities of from 0.5 to 3% by weight, based on the monomers.

The usual molecular weight regulators such as thioglycol, thioglycerol, tert.-dodecylmercaptan or nitrotoluene may also be used.

If polymerisation is carried out in solution, the copolymer solution is freed from solvent at temperatures of about 90° to 180°C in suitable apparatus, preferably in screw evaporators, for example by the method described in U.S. Pat. No. 3,741,272, and it is then cooled, granulated and ground. On the other hand, the product may also be isolated by other methods, for example by spray drying, removal of the solvent with steam and simultaneous dispersion of the product in water, or according to German Offenlegungsschrift No. 2,008,711 by precipitation with water from a water miscible solvent.

Polymerisation is preferably carried out solvent-free for example by the process described in U.S. Pat. No. 3,753,958 in which the hydroxylated resins used as starting materials in the present invention are also described.

When polymerisation has been terminated, the residual monomers or low boiling decomposition products of the initiator or the molecular weight regulators may be removed in a stream of nitrogen or by distillation under vacuum. The lacquer melt can be cooled on metal sheets or on rollers to form a vitreous resin or it may be processed directly as a melt.

When polymerised on their own, the monomers of group I result in polymers with a high glass transition temperature of 70°C to 110°C. The preferred monomers are styrene and/or methyl methacrylate.

The monomers of group II are film-forming substances which, when polymerised on their own, yield theromplasts with glass transition temperatures of from 80° to −80°C. The monomers of group II also serve to render the resins elastic.

The copolymerisable monomers of group II used may be aliphatic or cycloaliphatic esters of a crylic or methacrylic acid preferably containing 1 to 12, more preferably 2 to 8, most preferably 4 to 8 carbon atoms in the alcohol component. The following are specific examples: Methyl acrylate; ethyl acrylate, n- or isopropyl acrylate, butyl acrylate, 2-ethylhexylacrylate, dodecylacrylate, cyclohexylacrylate and the corresponding methacrylic acid esters. Butyl methacrylate, butyl acrylate and/or 2-ethyl-hexylacrylate are particularly suitable.

The monomers of group III which are used for incorporating chemically reactive groups are hydroxyalkyl esters of acrylic or methacrylic acid which contain 1 to 4 carbon atoms in the hydroxyalkyl part, e.g. hydroxyethyl acrylate, hydroxypropylacrylate, butane-1,4-diol-monoacrylate, reaction products of a crylic acid with glycidic or glycidyl compounds such as glycid, glycidic ethers or glycidic esters or the corresponding derivatives of methacrylic acid. Methacrylic acid derivatives such as $\beta$-hydroxyethyl methacrylate or $\beta$-hydroxypropylmethacrylate are preferred.

The hydroxyl number of the polymer depends on the amount of hydroxyalkylester derivative present and can be calculated as follows: Hydroxyl number × molecular weight of hydroxyalkylester/560 = percent by weight of hydroxyalkylester.

The reaction with aliphatic or cycloaliphatic dicarbxoylic acid anhydride is suitably carried out after solvent-free polymerisation, preferably in the melt. For this purpose, the resin melt is reacted with the anhydride at temperatures of 120°C to 200°C for 30 minutes to 3 hours until the required acid number of 22 to 110 mg of potassium hydroxide per g of substance has been reached.

The following anhydrides may be used: Maleic acid anhydride; succinic acid anhydride; adipic acid anhydride; polyadipic acid anhydride; polazelaic acid anhydride; polysebacic acid anhydride; polydodecanoic diacid anhydride and the corresponding chlorinated or brominated anhydrides. The following are suitable cycloaliphatic anhydrides. Tetrahydrophthalic acid anhydride; hexahydrophthalic acid anhydride; 2-methyl-tetrahydrophthalic acid anhydride; 2-methyl-hexahydrophthalic acid anhydride and the corresponding endomethylene derivatives obtained by reacting maleic acid anhydride with cyclopentadienes. Mixtures of these anhydrides may also be used. It is preferred to use succinic acid anhydride or mixtures of succinic acid anhydride with at least one of the above mentioned anhydrides in which the succinic acid anhydride content is preferably 50 mols %.

The pulverisable resins to be used in the process according to the invention may be reacted or mixed with a reactive component. The reaction may be carried out by simply mixing the components in the pulverulent state at room temperature, by gasification in a fluidised bed or by mixing the components in a molten state in a kneader, on rollers or in mixing screws. The melts are then cooled and granulated or ground. The reactive components are used for the subsequent crosslinking reaction in the powder lacquering process. Reactive components are components which react with carboxylic acid groups of the resins, such as bis- or tris-oxazolines or triglycidyl isocyanurate.

Particularly interesting for the mixtures according to the invention are polyoxazolines of the general formula

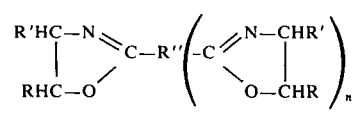

in which R and R' which may be the same or different, represent hydrogen, alkyl groups, preferably containing from 1 to 8 carbon atoms or aryl groups containing from 6 to 12 carbon atoms, in particular hydrogen or alkyl groups containing one or two carbon atoms, preferably hydrogen; R" represents a polyvalent and in particular a divalent organic group, preferably an alkylene chain with 1 to 8 carbon atoms or a divalent or trivalent aromatic group containing 6 to 12 carbon atoms, in particular a benzene group and $n$ represents 1 or 2.

The following oxazolines are specific examples:

1,2-, 1,3- and 1,4-bis-($\Delta$-2-oxazolinyl-2)benzene; 1,2- 1,3- 1,4-bis($\Delta$2-4-methyl-oxazolinyl-2)-benzene; 1,2-, 1,3-, 1,4-bis($\Delta$2-3-methyl-oxazolinyl-2)-benzene; 1,2-, 1,3-, 1,4-bis($\Delta$2-5-methyl-oxazolinyl-2)-benzene; 1,2- 1,3-, 1,4-bis($\Delta$2-5-ethyloxazolinyl-2)-benzene; 1,2,4-tris-($\Delta$2-oxazolinyl-2)-benzene; 1,2-bis-($\Delta$2-oxazolinyl-2)-ethane; 1,4-bis-($\Delta$2-oxazolinyl-2)-butane; 1,4-bis-($\Delta$2-5-methyl-oxazolinyl-2)-butane. 1,4-Bis-($\Delta$-2-oxazolinyl-2)-benzene is preferred.

The binders according to the invention, which have melt viscosities of 50–400 poises at 180°C and 6900 dyn/cm$^2$ shearing stress can easily be converted into particles of about 4 to 300$\mu$, preferably 30 to 120$\mu$, without clumping together, and they may then be used for coating a wide variety of materials by various immersion or spray coating techniques such as whirl sintering or flame spraying or, preferably, by the electrostatic coating process.

When they have been isolated, the copolymers may be mixed with up to 150% by weight, preferably to to 100% by weight, of inorganic or organic pigments, based on the copolymers, at temperatures of from 80°C to 120°C. The following are examples of pigments which may be used: Titanium dioxide; iron oxides, chromium oxide, phthalocyanine pigments and azo pigments.

Levelling agents such as silicones, polyesters, cellulose derivatives, oligomeric acrylates, phosphoric acid esters, phthalic acid esters, adipic acid esters and also catalysts such as organic and inorganic acids, tertiary amines, imidazoles, dicyandiamide and tin compounds may be added to the melts (0.1 to 40% by weight, based on the copolymer).

Pigments and levelling agents may, of course, also be added to the monomers before polymerisation or, in the case of solution polymerisation, they may be added to the copolymer solution after polymerisation and before removal of the solvent.

The incorporation of the triglycidyl isocyanurate or bis- or tris-oxazoline is preferably carried out in a mixing screw at temperatures of 80° to 120°C at the same time that the pigments, levelling agents and catalysts are added. The mixing time should be about 0.5 to 10 minutes. If mixing is continued for a longer time, the product starts to undergo cross-linking. If these conditions are observed a homogeneous mixture is obtained which will not separate into its components even on cooling.

The solvent-free and, optionally, pigmented mixtures which are brittle in the uncrosslinked state when cold are preferably ground down to a fine grain of about 30 to about 120$\mu$ and, if desired, sorted according to particle size by sifting.

The polymer powders according to the invention are still pourable at temperatures of at least 40°C, preferably 50°C, and have spreading temperatures of 80°C to 120°C. They are stoved within 10 to 30 minutes at temperatures from 120°C to 220°C, preferably 140°C to 180°C, cross-linking occurring during this time.

The average molecular weights of the polymer powders are between 3000 and 20,000, determined in an organic solvent by the method of measuring the reduction in vapour pressure.

The application of the pulverulent binders to suitable substrates, in particular to metals, is carried out by known methods of immersion or spray coating such as whirl sintering or flame spraying or, preferably, the electrostatic powder spray process (40 to 90 KV). See D. R. Davis, "Coating with electrostatic dry spray" in Plastics Technology, June 1962, pages 37–38.

The stoved films (thickness 40-300$\mu$) of the polymer powders according to the invention combine excellent adherence and hardness with elasticity. They are also distinguished by their high gloss and resistance to weathering.

The powders may be used for coating domestic utensils and, especially, metal parts in motor vehicles or any other metal parts which are exposed to severe weathering conditions such as motorcar bodies, metal facings, pipes, wire netting and implements used in forestry and agriculture.

The coatings serve mainly as protection against corrosion and mechanical wear for articles made of metal such as steel, cast steel, copper, brass, bronze, red brass, aluminium and its alloys and galvanised surfaces and articles made of porcelain, ceramics or plastics as well as some types of wood. They may also be used as electric insulating coatings in electrotechnology, e.g. for lamps, switches, and parts of motors. The whirl sintering process may be used, for example, for coating domestic articles, refrigerator shelves, coat racks, fancy goods, baskets and bottle holders and pipes. The flame spraying process and electrostatic powder coating process are preferably used for coating large surfaces of the above mentioned materials. These processes are used, for example, for coating the internal and external surfaces of pipes and containers. The binders are particularly advantageously used as top lacquer coatings for motor cars because of their excellent flow.

Preparation of the powders and their use as electrostatically sprayable powders are described in the following examples. The parts and percentages given in the examples are parts and percentages by weight unless otherwise indicated.

Comparison Experiment

The acrylic resin used was a binder prepared according to Example 1 of U.S. Pat. No. 3,753,958 and had the following composition:

Resin A:
10% by weight of acrylic acid
32.5% by weight of butyl acrylate
12.5% by weight of methyl methacrylate
45% by weight of styrene.

Its average molecular weight was about 7000 and it was pourable at temperatures of up to 50°C and had an acid number of 77 mg of potassium hydroxide per g of substance.

Resin A was mixed with the following components in an extruder at 110°C:

Mixture I:

Resin A: 100 parts by weight
Titanium dioxide: 50 parts by weight
Triglycidylisocyanurate: 7 parts by weight Levelling agent
(Oligo ester acrylate obtained from 30 parts by weight of ethyalcrylate and 70 parts by weight of ethyl hexyl acrylate with a viscosity of 2200 poises at 23°C): 1.0 part by weight.

Mixture II:
Resin A: 100 parts by weight
Titanium dioxide: 50 parts by weight
1,4-bis(Δ2-oxazolinyl-2)benzene: 10 parts by weight
Levelling agent (as for mixture I): 1.0 part by weight When cold, the extruded mixtures were ground to particles of 50 to 80μ and electrostatically sprayed on degreased sheet iron at 40 KV.

To obtain an Erichsen cupping value of 6 mm, mixture I had to be stoved for 30 minutes at 200°C and Mixture II for 30 minutes at 180°C.

When mixture I was stoved for 15 minutes at 180°C and mixture II for 20 minutes at 160°C, the Erichsen cupping value was less than 5 mm.

EXAMPLES 1 AND 2

The following monomer mixtures were polymerised by the method described in Example 1 of U.S. Pat. No. 3,753,958.

| Mixture | B | C | D | E |
|---|---|---|---|---|
| Styrene | 350 | 500 | — | 350 |
| Butyl acrylate | 300 | 160 | 60 | 250 |
| Hydroxypropyl methacrylate | — | 200 | — | — |
| Hydroxyethyl methacrylate | 180 | — | — | 180 |
| Butanediol monoacrylate | — | — | 200 | — |
| Methyl methacrylate | 30 | — | 600 | 80 |
| Hydroxyl number of the resin | 90 | 90 | 89 | 91 |
| Average molecular weight | 5700 | 5400 | 7800 | 6300 |

After solvent-free polymerisation, the resins and equivalent quantity of succinic acid anhydride (140g) were stirred together for 30 minutes at 160°C and then cooled by pouring out on a cold metal sheet.

| Resin | B | C | D | E |
|---|---|---|---|---|
| Acid number | 77.0 | 77.0 | 75 | 77.6 |

Resins, B, C, D and E were made up into powder lacquers as described above, using 10 parts by weight of 1,4-bis-(Δ2-oxazolinyl-2)-benzene (a) or 7 parts by weight of triglycidyl isocyanurate (b), 50 parts by weight of titanium dioxide and 1 part by weight of levelling agent to 100 parts by weight of resin.

| Resin | B | | C | | D | | E | |
|---|---|---|---|---|---|---|---|---|
| | a | b | a | b | a | b | a | b |
| Stoving temperature °C | 160 | 180 | 160 | 180 | 140 | 160 | 160 | 180 |
| Stoving time (minutes) | 20 | 30 | 20 | 20 | 40 | 40 | 20 | 20 |
| Erichsen cupping DIN 53 156 | 6 | 8 | 5 | 4 | 9 | 8 | 7 | 6 |
| Level flow | good | | very good | | satisfactory | | very good | |
| Gloss ASTMD 523 (60°C) | 90 | | 95 | | 83 | | 91 | |
| Softened by solubility in xylene | negative | | negative | | negative | | negative | |
| Pencil hardness | 4H | 3H | 5H | 5H | 2H | 2H | 6H | 5H |
| Weatherometer no reduction in gloss up to hours | 300 | 350 | 300 | 450 | 800 | 900 | 350 | 400 |

We claim:
1. A powdered coating agent comprising a mixture of
A. 96 to 80 parts by weight of a random addition copolymer having free hydroxyl groups of which 50 to 100 mol % thereof have been reacted with at least one aliphatic or cycloaliphatic dicarboxylic acid anhydride to obtain an acid number of 22 to 110 mg. of potassium hydroxide per g. of reaction product, said random addition copolymer before reaction with said anhydride being a copolymer of
I. 30 to 85% by weight of styrene, α-methylstyrene, o-chlorostyrene, p-chlorostyrene, p-tert.butylstyrene, methylmethacrylate or a mixture of at least two of said monomers,
II. 5 to 60% by weight of acrylic acid ester having 1 to 12 carbon atoms in the alcohol moiety, methacrylic acid ester having 2 to 12 carbon atoms in the alcohol moiety or a mixture thereof and
III. 10 to 30% by weight of a hydroxyalkyl ester of acrylic acid or methacrylic acid having 2 to 4 carbon atoms in the hydroxyalkyl moiety,
the sum of the percentage contents of I to III being 100 and the molecular weight of said copolymer of I to III being 3,000 to 20,000 and its hydroxyl number being 50 to 126 mg. of potassium hydroxide per g. of copolymer and
B. 4 to 20 parts by weight of triglycidylisocyanurate, a bisoxazoline or a trisoxazoline.
2. The powdered coating agent of claim 1 including 150% by weight, based on the combined weight of (A) and (B), of at least one pigment.
3. The powdered coating agent of claim 1 including 0.1 to 40% by weight, based on the weight of (A), of a leveling agent.

* * * * *